United States Patent
Feldtkeller et al.

(10) Patent No.: US 6,757,183 B2
(45) Date of Patent: Jun. 29, 2004

(54) METHOD FOR STARTING UP A SWITCHED-MODE POWER SUPPLY, AND SWITCHED-MODE POWER SUPPLY HAVING A STARTING CIRCUIT

(75) Inventors: Martin Feldtkeller, Mënchen (DE); Peter Preller, Mënchen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/200,704

(22) Filed: Jul. 22, 2002

(65) Prior Publication Data

US 2003/0007367 A1 Jan. 9, 2003

Related U.S. Application Data

(63) Continuation of application No. PCT/EP01/00168, filed on Jan. 9, 2001.

(30) Foreign Application Priority Data

Jan. 20, 2000 (DE) .......................................... 100 02 325

(51) Int. Cl.$^7$ ............................................. H02M 3/335
(52) U.S. Cl. ..................... 363/49; 363/21.1; 363/21.18; 363/97
(58) Field of Search .......................... 363/21.12, 21.14, 363/21.15, 21.16, 21.18, 34, 37, 49, 97, 131, 127, 21.1; 323/901

(56) References Cited

U.S. PATENT DOCUMENTS

| | | | |
|---|---|---|---|
| 4,277,824 A | | 7/1981 | Alberkrack |
| 4,695,936 A | * | 9/1987 | Whittle ........................ 363/21.1 |
| 5,452,195 A | | 9/1995 | Lehr et al. |
| 5,581,451 A | * | 12/1996 | Ochiai ....................... 363/21.16 |
| 5,684,679 A | * | 11/1997 | Hong ........................ 363/21.01 |
| 5,838,181 A | * | 11/1998 | Hesterman ................... 327/175 |
| 5,991,169 A | * | 11/1999 | Kooken ........................ 363/17 |
| 6,314,003 B2 | | 11/2001 | Preller |
| 6,434,025 B2 | * | 8/2002 | Shirai et al. ................ 363/21.1 |
| 6,434,030 B1 | * | 8/2002 | Rehm et al. .................. 363/97 |
| 6,496,389 B1 | * | 12/2002 | Yasumura ................ 363/21.04 |

FOREIGN PATENT DOCUMENTS

| | | |
|---|---|---|
| DE | 3427221 A1 | 1/1986 |
| DE | 41 11 277 A1 | 10/1992 |
| DE | 198 37 919 A1 | 3/1999 |
| DE | 198 05 927 A1 | 10/1999 |
| EP | 0 494 327 A1 | 7/1992 |

* cited by examiner

*Primary Examiner*—Michael Sherry
*Assistant Examiner*—Gary L. Laxton
(74) *Attorney, Agent, or Firm*—Laurence A. Greenberg; Werner H. Stemer; Ralph E. Locher

(57) ABSTRACT

To start a switching power supply in an energy saving manner, the method and device according to the invention transmits the energy that is collected by the Y-capacitors through a diode to a capacitor that is located on the secondary side. Once the voltage in the capacitor reaches a first predefinable minimum value, the voltage is applied to an impulse generator as an input voltage and the generator starts the switching power supply. Once the voltage in an additional capacitor on the secondary side reaches a second predefinable minimum value, the voltage in the capacitor is also applied as an input voltage to a control unit, preferably, a microprocessor, that controls the impulse generator.

27 Claims, 3 Drawing Sheets

METHOD FOR STARTING UP A SWITCHED-MODE POWER SUPPLY, AND SWITCHED-MODE POWER SUPPLY HAVING A STARTING CIRCUIT

CROSS-REFERENCE TO RELATED APPLICATION

This application is a continuation of copending International Application No. PCT/EP01/00168, filed Jan. 9, 2001, which designated the United States and was not published in English.

BACKGROUND OF THE INVENTION

FIELD OF THE INVENTION

The invention relates to a method for starting up a switched-mode power supply, as well as a switched-mode power supply having a starting circuit, in which the alternating voltage inputs of a bridge rectifier, at which an alternating voltage is adjacent, are connected with one another through a Y capacitor or a series circuit of two Y capacitors, in which a parallel circuit, made up of a first capacitor and a series circuit made up of the primary winding or coil of a first transformer and a first controllable switch, is connected to the direct voltage outputs of the bridge rectifier, whose control input is connected with the output of a pulse generator, and in which a series circuit of a first diode and a second capacitor is situated parallel to the secondary winding of the transformer.

The prior art includes providing a battery or an accumulator for starting up a switched-mode power supply.

However, the prior art method for starting up a switched-mode power supply has the disadvantage that the manufacturing costs are relatively high, and the endurance or life of the battery or of the accumulator is limited.

SUMMARY OF THE INVENTION

It is accordingly an object of the invention to provide a method for starting up a switched-mode power supply, and switched-mode power supply having a starting circuit that overcome the hereinafore-mentioned disadvantages of the heretofore-known devices of this general type and that requires only a low technical outlay, has low manufacturing costs, and guarantees the endurance over a long period of time.

With the foregoing and other objects in view, there is provided, in accordance with the invention, a method for starting up a switched-mode power supply, including the steps of providing a bridge rectifier having alternating voltage inputs, a control input, and direct voltage outputs, disposing an alternating voltage at the alternating voltage inputs of the bridge rectifier, connecting the alternating voltage inputs with one another through a Y capacitor circuit including one of a Y capacitor and a series circuit of two Y capacitors, providing a first transformer having a primary winding and a secondary winding, providing a first series circuit made up of the primary winding of the first transformer and a first controllable switch, connecting the control input of the bridge rectifier with an output of a pulse generator, connecting a parallel circuit made up of the first series circuit and a first capacitor to the direct voltage outputs of the bridge rectifier, connecting a second series circuit made of a first diode and a second capacitor in parallel to the secondary winding of the first transformer, transmitting energy collected by the Y capacitor circuit to the second capacitor, and driving the controllable switch by producing pulses with the pulse generator dependent on a voltage tapped at the second capacitor.

In accordance with another mode of the invention, the energy collected by the Y capacitors is transmitted to the second capacitor, and the pulse generator produces drive, trigger, or control pulses for the controllable switch dependent on a voltage that can be tapped at the second capacitor.

In accordance with a further mode of the invention, preferably, the pulse generator begins to produce drive pulses for the controllable switch only when the voltage at the second capacitor has exceeded a first threshold value. According to a specific embodiment of the invention, it is thereby provided that the voltage that can be tapped at the second capacitor is applied as a supply voltage to a supply voltage input of the pulse generator only when it has reached a first predeterminable minimum value in order to switch on the pulse generator.

In accordance with an added mode of the invention, preferably, the pulse generator produces no drive pulses when the voltage at the second capacitor has decreased below a second threshold value, whereby the second threshold value is smaller than the first threshold value. If the pulse generator is switched on, it receives current from the second capacitor, resulting in a lowering of the voltage that is adjacent over the second capacitor. Because the first threshold value, upon the reaching of which drive pulses are produced, is higher than the second threshold value, with no drive pulses being produced when the value falls below this second threshold value, the invention prevents the situation where the production of the drive pulses is immediately terminated again when there is a slight decrease of the voltage at the second capacitor at the beginning of the production of the drive pulses.

In accordance with an additional mode of the invention, the pulse generator has a supply voltage input, and the voltage tapped at the second capacitor is applied to the supply voltage input of the pulse generator only when the voltage tapped at the second capacitor reaches a first predeterminable minimum value.

In accordance with yet another mode of the invention, a control unit is connected to the pulse generator for controlling the pulse generator and the voltage tapped at the second capacitor is applied to the control unit only after a predeterminable time period after a switching on of the pulse generator.

In accordance with yet a further mode of the invention, there is provided a third series circuit made up of a second diode and a third capacitor, a second secondary winding of the first transformer is connected in parallel to the third series circuit, a voltage with the second secondary winding of the first transformer is produced at the third capacitor and the voltage tapped at the second capacitor is applied to the control unit when the voltage at the third capacitor reaches a second predeterminable minimum value.

With the objects of the invention in view, there is also provided a switched-mode power supply having a starting circuit, the power supply including a bridge rectifier having alternating voltage inputs to be connected to an alternating voltage, at least one direct voltage output, and a control input, a plurality of Y capacitors including two Y capacitors connected in series to form a first series circuit having a first common connection point, the alternating voltage inputs of the bridge rectifier connected with one another through one of the group consisting of one of the Y capacitors and the first series circuit, a pulse generator having an input and an output, a transformer having a primary winding and a secondary winding, a controllable switch connected in series to the primary winding to form a second series circuit, a first capacitor connected in parallel to the second series circuit to form a parallel circuit, the parallel circuit connected to the at least one direct voltage output of the bridge rectifier, the control input of the bridge rectifier connected to the output of the pulse generator, a first diode and a second capacitor connected in series to form a third series circuit having a second common connection point, the third series circuit connected in parallel to the secondary winding of the transformer, a second diode connecting the first common connection point to the second common connection point, and a signal supply device supplying a signal dependent on a voltage over the second capacitor to the input of the pulse generator.

In accordance with yet an added feature of the invention, the common connection point of the two Y capacitors is connected with the common connection point of the first diode and the second capacitor through a second diode, and a signal dependent on the voltage over the second capacitor is supplied to an input of the pulse generator, dependent on which the pulse generator produces drive pulses for the controllable switch.

In accordance with yet an additional feature of the invention, a system having a first threshold value detector and a second controllable switch is connected between the second capacitor and the pulse generator. The first threshold value detector is situated parallel to the tapping of the voltage at the second capacitor, whereby the output of the threshold value detector is connected with a control input of the second controllable switch, which connects a supply voltage input of the pulse generator with the common connection point of the first diode and the second capacitor. The threshold value detector preferably has a hysteresis characteristic; i.e., the second controllable switch is driven conductive when the voltage over the second capacitor reaches a first threshold value, and the second switch is blocked or disabled when the voltage over the second capacitor decreases below a second threshold value, the second threshold value being smaller than the first threshold value. In this specific embodiment, the pulse generator is switched on for the production of drive pulses when the second switch is switched on, and the voltage that is adjacent over the second capacitor is applied to the pulse generator as a supply voltage, and the pulse generator is switched off when the second switch switches off.

To charge the second capacitor, which acts as a smoothing capacitor in the secondary circuit, according to the inventive method or in the inventive switched-mode power supply at least one capacitor is connected to the alternating voltage inputs of the bridge rectifier of the switched-mode power supply, and the energy collected by this capacitor is transmitted, through a diode, to the smoothing capacitor connected to the secondary winding of the transformer. It is particularly advantageous to use the Y capacitors, which in many switched-mode power supplies are for safety reasons already connected to the alternating voltage inputs, to collect the energy.

As soon as the smoothing capacitor has been charged to a predeterminable minimum voltage, this minimum voltage is applied to the supply voltage inputs of the pulse generator of the switched-mode power supply to switch it on. Because the pulse generator now emits switching pulses to the controllable switch in the primary circuit of the switched-mode power supply, in the secondary circuit the output voltage of the switched-mode power supply is slowly built up.

A construction of the inventive method provides in the transformer a second secondary winding to which a series circuit of a diode and an additional capacitor is connected, which is now charged because the pulse generator clocks or supplies the switched-mode power supply with clock pulses, or operates the switched-mode power supply in switching mode. As soon as the voltage at this additional capacitor reaches a predetermined minimum value, the output voltage of the switched-mode power supply, which can be tapped at the smoothing capacitor, is applied to the supply voltage of a control unit that controls the pulse generator, preferably, a microprocessor, to switch it on. The switched-mode power supply is now ready for operation, and can supply a load with a regulated voltage.

In accordance with again another feature of the invention, the input of the pulse generator has a supply voltage input and a control input, the transformer has a second secondary winding, a third diode and a third capacitor are connected in series to form a fourth series circuit, the second secondary winding is connected in parallel with the fourth series circuit, a second threshold value detector has an output, a control unit has a supply voltage input and a control output connected to the control input of the pulse generator, a second controllable switch has a control input, the second controllable switch connecting the supply voltage input of the pulse generator to the supply voltage input of the control unit, the second threshold value detector is connected in parallel to the third capacitor, and the output of the second threshold value detector is connected to the control input of the second controllable switch.

In accordance with again a further feature of the invention, there is provided a fourth diode and a fourth capacitor connected in parallel to the fourth diode to form a second parallel circuit, the second parallel circuit disposed between the two Y capacitors.

In accordance with again an added feature of the invention, there is provided at least one fifth diode disposed between the second controllable switch and the supply voltage input of the pulse generator.

In accordance with again an additional feature of the invention, there is provided a second transformer having a primary winding and a secondary winding, an RC element having a fifth capacitor and a first resistor, the output of the pulse generator being a control output connected through the RC element to the primary winding of the second transformer, and the secondary winding of the second transformer being connected with the controllable switch.

In accordance with still another feature of the invention, the bridge rectifier has a direct voltage terminal connection, the controllable switch has a terminal connection, the secondary winding of the second transformer has a terminal connection, a fourth diode and a fourth capacitor are connected in parallel to form a second parallel circuit having a third common connection point, the second parallel circuit is disposed between the two Y capacitors, the primary winding of the second transformer has a terminal connection, the transformer has a second secondary winding, the secondary winding and the second secondary winding of the transformer each have a terminal connection, the direct voltage terminal connection of the bridge rectifier, the terminal connection of the controllable switch, and the terminal connection of the secondary winding of the second transformer are at ground at a primary side, and the third common connection point, the terminal connection of the primary winding of the second transformer, and the terminal connection of each of the secondary winding and the second secondary winding of the transformer are at ground at a secondary side.

In accordance with still a further feature of the invention, the secondary winding of the transformer has a winding direction to form a forward converter.

In accordance with still an added feature of the invention, the secondary winding of the transformer has a given winding direction and the second secondary winding of the transformer has a winding direction opposite to the given winding direction to form a flyback converter.

In accordance with still an additional feature of the invention, there is provided a fourth capacitor and a fourth diode are connected in parallel to form a third parallel circuit with first and second terminal connections, the third parallel circuit is disposed between the two Y capacitors, the first terminal connection of the third parallel circuit being at ground at a secondary side and the second terminal connection of the third parallel circuit being connected, through the second diode, with the second common connection point, second and third resistors connected together to form a first voltage divider, the first voltage divider divided connected in parallel with the second capacitor and having a center tap, a common connection point of the secondary winding of the transformer and the second capacitor is at secondary-side ground, a common connection point of the second secondary winding of the transformer and the third capacitor is at secondary-side ground, the input of the pulse generator has a first supply voltage input and a second supply voltage input, the second supply voltage input is at ground at a secondary side, a second transistor has an emitter, a collector, and a base, a fifth series circuit includes an emitter-collector circuit of the second transistor, a fifth diode, and a sixth diode, the second common connection point is connected with the first supply voltage input of the pulse generator through the fifth series circuit, a third transistor has a collector-emitter path, and a base, a fourth resistor is connected to the collector-emitter path of the third transistor to form a sixth series circuit, the base of the second transistor is at secondary-side ground through the sixth series circuit, the base of the third transistor is connected to the center tap of the first voltage divider and to the collector of the second transistor through a fifth resistor, a fourth transistor has an emitter and an emitter-base path, a fifth transistor has a base and a collector-emitter path, the emitter-base path of the fourth transistor, a sixth resistor, and the collector-emitter path of the fifth transistor are connected to form a seventh series circuit, the first supply voltage input of the pulse generator, to which the sixth diode is connected, is at secondary-side ground through the seventh series circuit, seventh and eighth resistors are connected to form a second voltage divider having a center tap, the second voltage divider is connected in parallel with the third capacitor, the center tap of the second voltage divided is connected with the base of the fifth transistor, the supply voltage input of the control unit has first and second supply voltage inputs, the second supply voltage input is at ground at a secondary side, the emitter of the fourth transistor is connected to the first supply voltage input of the control unit, a second transformer has a primary winding and a secondary winding with a first terminal and a second terminal, an RC element has a fifth capacitor and a first resistor, the RC element is connected to the primary winding of the second transformer to form an eighth series circuit, the output of the pulse generator is connected to ground at a secondary side through the eighth series circuit, the first terminal the secondary winding of the second transformer is at ground at a primary side, the controllable switch is a transistor with a gate electrode, and the second terminal of the secondary winding of the second transformer is connected with the gate electrode of the controllable switch.

In accordance with another feature of the invention, the fourth transistor has a collector, an infrared amplifier has first and second supply voltage inputs and an output, the collector of the fourth transistor is connected with the first supply voltage input of the infrared amplifier, the second supply voltage input of the infrared amplifier is at ground at a secondary side, and the output of the infrared amplifier is connected with the supply voltage input of the control unit.

In accordance with a further feature of the invention, there is provided a voltage stabilizer disposed between the collector of the fourth transistor and the control unit and the infrared amplifier.

In accordance with an added feature of the invention, the control unit is a microprocessor.

In accordance with an additional feature of the invention, the starting circuit including the second through sixth diodes, the second through eighth resistors, and the third, fourth, and fifth transistors is an integrated circuit.

In accordance with yet another feature of the invention, the input of the pulse generator is a supply voltage input and the first input is connected to the second common connection point.

In accordance with yet a further feature of the invention, the pulse generator has a second voltage detection input and the second voltage detection input is connected to the second common connection point.

In accordance with yet an added feature of the invention, dependent upon a signal at the second voltage detection input, the pulse generator is adapted to assume one of a first state in which no drive pulses are available at the output of the pulse generator and a second state in which drive pulses are available at the output of the pulse generator.

In accordance with a concomitant feature of the invention, the at least one direct voltage output is a plurality of direct voltage outputs.

The inventive starting up of the switch-mode power supply takes place in four steps.

In the first step, energy is collected at the alternating voltage input of the bridge rectifier, and is transferred to a capacitor of the secondary side of the switched-mode power supply. In the following second step, the pulse generator is switched on when the energy transferred to the capacitor (or, in other words, the voltage at the capacitor) reaches a predeterminable first minimum value. In the subsequent third step, due to the switched-on pulse generator the output voltage of the switched-mode power supply slowly builds up to the target value. Finally, in the fourth step, which terminates the starting up, the control unit controlling the pulse generator is switched on when the output voltage of the switched-mode power supply reaches a predeterminable second minimum value. Thus, the pulse generator and the control unit that controls it are switched on one after the other during the starting up of the switched-mode power supply.

Other features that are considered as characteristic for the invention are set forth in the appended claims.

Although the invention is illustrated and described herein as embodied in a method for starting up a switched-mode power supply, and switched-mode power supply having a starting circuit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
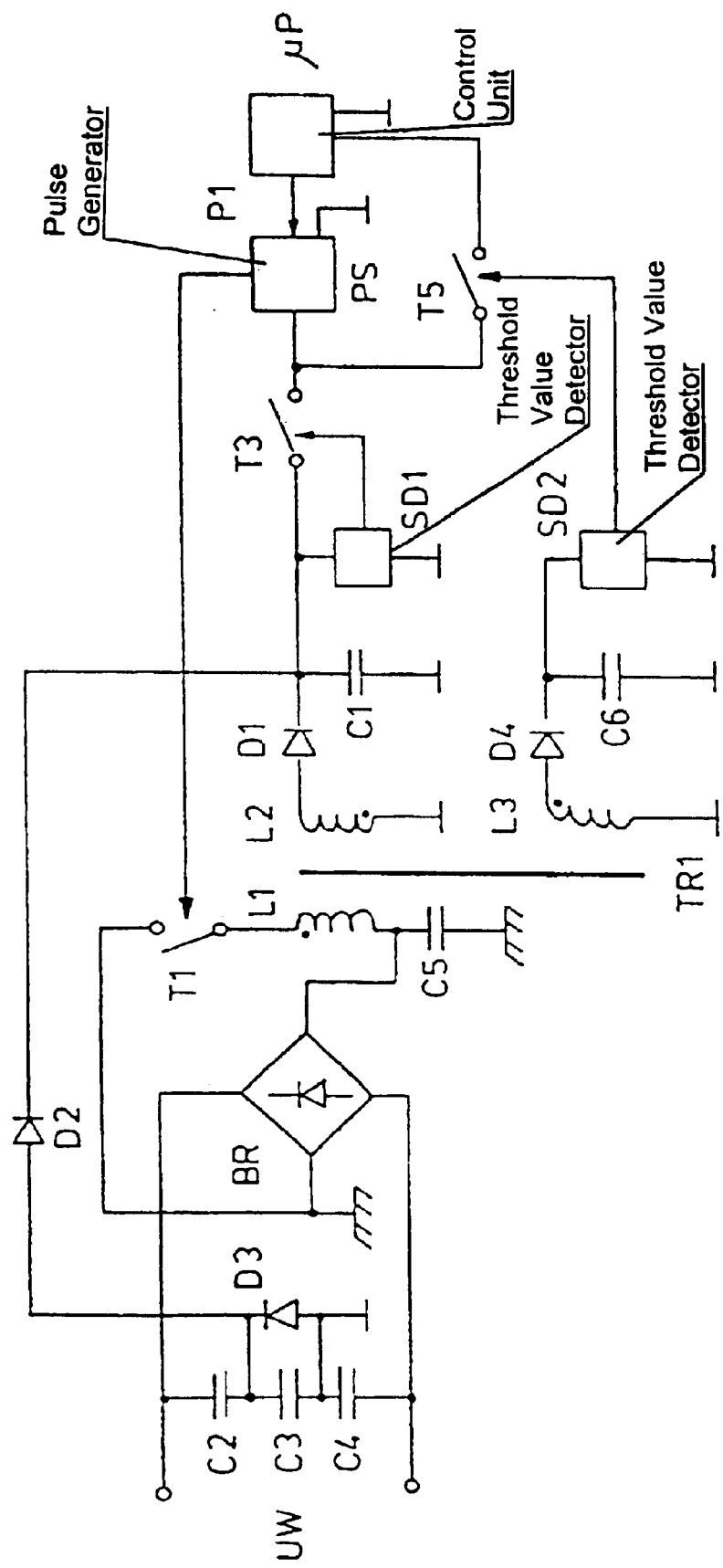
FIG. 1 is a block and schematic circuit diagram of a first exemplary embodiment of a switched-mode power supply according to the invention.

Referring now to the figures of the drawings in detail and first, particularly to FIG. 1 thereof, there is shown an exemplary embodiment of an inventive switched-mode power supply, the alternating voltage inputs of a bridge rectifier BR, at which an alternating voltage UW, for example, the line voltage or supply voltage, is adjacent, are connected with one another through a series circuit of three capacitors C2, C3, and C4. The two capacitors C2 and C4 are the Y capacitors, as they are called. A diode D3 is situated parallel to capacitor C3. The direct voltage outputs of bridge rectifier BR are connected with one another through a series circuit of a primary winding L1 of a transformer TR1 and a capacitor C5. The direct voltage output of bridge rectifier BR to which capacitor C5 is connected is at ground at the primary side, while the other direct voltage output of bridge rectifier BR, to which primary winding L1 is connected, can be connected with ground at the primary side through a controllable switch T1, preferably, a field-effect transistor. A series circuit of a diode D1 and a capacitor C1, provided as a smoothing capacitor, is situated parallel to a secondary winding L2 of transformer TR1. The common connection point of the two capacitors C2 and C3 is connected with the common connection point of diode D1 and capacitor C1 through a diode D2. The common connection point of capacitor C1 and secondary winding L2 is at ground at the secondary side. The common connection point of capacitor C1 and diode D1 is connected with the one supply voltage input of a pulse generator PS through a controllable switch T3, for example, a PNP transistor, the other supply voltage input of the pulse generator being at ground at the secondary side, and the control output thereof being connected with the control input of controllable switch T1. Parallel to capacitor C1 is situated a threshold value detector SD1, whose control output is connected with the control input of controllable switch T3. Transformer TR1 has a second secondary winding L3 to which, as also to the secondary winding, a series circuit of a diode D4 and a capacitor C6 is connected in parallel. The common connection point of capacitor C6 and second secondary winding L3 is at ground at the secondary side. Parallel to capacitor C6 there is located a threshold value detector SD2, whose output is connected with the control input of a controllable switch T5, for example, a PNP transistor, that connects the one supply voltage input of pulse generator PS with the one supply voltage input of a control unit µP, whose other supply voltage input is at ground at the secondary side. A microprocessor can for example be used for control unit µP. Control output P1 of control unit µP is connected with the control input of pulse generator PS.

To enable a clearer explanation of the functioning of the first exemplary embodiment of an inventive switched-mode power supply, shown in FIG. 1, first the energy characteristics at the primary side and at the secondary side of the switched-mode power supply are discussed.

Alternating voltage UW is adjacent to the series circuit of the three capacitors C2, C3, and C4. Capacitors C2 and C4 are the capacitors called Y capacitors, which for reasons of safety satisfy high demands, and whose capacitance may not exceed the sum of 4.7 nF. Standardly, the common connection point of the two Y capacitors C2 and C4 is at ground at the secondary side, but, in the exemplary embodiment of the invention, a capacitor C3 is situated between the two Y capacitors C2 and C4 to apply Y capacitor C2 to ground at the secondary side in terms of high frequency. For Y capacitors C2 and C4, a capacitance of, e.g., 2 nF each is assumed. For a long-range power supply, suitable for line voltages of 90 to 270 V, the current through Y capacitors C2 and C4 can be calculated as follows for a system frequency or line frequency of 50 Hz, without taking into account capacitor C3:

$$Iy=(C \cdot U)/t=(2\ nF \cdot 90V \cdot \sqrt{2})/20\ ms=13\ \mu A.$$

Taking losses into account, a value of 10 µA is realistic for current Iy through Y capacitors C2 and C4.

For a gate voltage of 10 V, drive current Is of a MOS field-effect transistor having a gate capacitance of 1 nF and a switching frequency of 20 kHz is:

$$Is=(1\ nF \cdot 10V)/50\ \mu s=200\ \mu A$$

Thus, given a gate capacitance of only 1 nF and a relatively low switching frequency of only 20 kHz, a current is required that is greater by a factor of 20 than that which can be transported through the Y capacitors.

To be able to supply a first drive pulse from the secondary side to the primary side of the switched-mode power supply, the low current Iy through Y capacitors C2 and C4 is first collected to form a larger quantity of energy. To match the drive current Is of the MOS field-effect transistor, used as a controllable switch, to the current Iy through Y capacitors C2 and C4, the switching frequency is to be lowered to 1 kHz.

However, it is not possible to start up a switched-mode power supply with such a low frequency.

However, if sufficient energy is first collected for the transmission of the first drive pulse, then, by sending the drive pulse, a much greater energy can be transmitted to the secondary side by transformer TR1. Under the assumptions made above, the energy Es of a drive pulse is calculated as:

$$Es=0.5 \cdot C \cdot U^2=0.5 \cdot 10\ nF \cdot (10V)^2=0.5\ \mu Ws$$

The transformer of a switched-mode power supply, for a power of 100 W and having a switching frequency of 20 kHz, can store energy Etr:

$$Etr=100\ W/20\ kHz=5000\ \mu Ws$$

The ratio of the two energy quantities, Etr to Es, is accordingly:

$$Etr/Es=5000\ \mu Ws/0.5\ \mu Ws=10{,}000$$

After the collection of the energy required for a drive pulse, and the sending of the drive pulse, an energy greater by a factor of 10,000 can be recovered. The energy can also be transmitted through a flux converter.

The alternating current flowing through the two Y capacitors C2 and C4 is rectified by the two diodes D2 and D3, and charges capacitor C1 at the secondary side, which acts as an energy storage unit for the production of the first drive pulse.

If the value of capacitor C1 is selected at 1 µF, and capacitor C1 is to be charged to a voltage of 10 V, the maximum charge time t1 is calculated as:

$$t1=(C1 \cdot U)/I=(1\ \mu F \cdot 10\ V)/10\ \mu A=1\ s$$

A wait time of one second is still acceptable. The energy EC1 stored in capacitor C1 is then:

$$EC1=0.5 \cdot 1\ \mu F \cdot (10V)^2=50\ \mu Ws$$

The ratio of EC1 to Es is:

$$EC1/Es=50\ \mu Ws/0.5\ \mu Ws=100$$

Even taking into account the high transmission losses, which are to be expected, in transformer TR1, there is, thus, sufficient energy for the production and transmission of the first drive pulse. Due to the extraordinarily high ratio Etr/Es=10,000, the continuation of the startup is also ensured.

The alternating current flowing through Y capacitors C2 and C4 is rectified by diodes D2 and D3. The direct current so produced charges capacitor C1, for which, for example, an electrolytic capacitor is suitable. Capacitor C3, situated between the two Y capacitors C2 and C4, produces the HF connection between Y capacitor C2 and secondary-side ground so that the interference suppression function of the two Y capacitors C2 and C4 is maintained.

As soon as threshold value detector SD1 detects a voltage at capacitor C1 that reaches a first threshold value, or the predeterminable minimum value, it closes controllable switch T3 so that pulse generator PS is supplied with voltage and emits switching pulses to controllable switch T1 to open and close it. Through the clocking of controllable switch T1, energy is transmitted from the primary side to the secondary side of transformer TR1 so that the output voltage of the switched-mode power supply builds up slowly at capacitor C1. Because energy is also transmitted from primary winding L1 into second secondary winding L3 of transformer TR1, capacitor C6 is likewise charged. As soon as threshold value detector SD2 detects a voltage at capacitor C6 that exceeds a predeterminable second minimum value, controllable switch T5 is closed to supply control unit $\mu P$ with voltage as well. Control unit $\mu P$ now controls pulse generator PS. The starting process of the switched-mode power supply is therewith terminated.

The threshold value detector preferably has a hysteresis characteristic; i.e., the threshold value detector blocks controllable switch T3 again only when the voltage at the second capacitor has decreased below a second threshold value that is lower than the first threshold value. When switch T3 is switched on, the voltage supply of the pulse generator takes place from second capacitor C2, resulting in a decrease in the voltage over the second capacitor shortly after the switching on. Because the second threshold value, which determines the switching off, is smaller than the first threshold value, which determines the switching on, it is prevented that, given a decrease of the voltage over the capacitor after the switching on switch T3, this switch is immediately blocked again, interrupting the voltage supply of the pulse generator.

In the exemplary embodiment shown in FIG. 1, the system made up of threshold value detector SD1 and switch T3 supplies a signal that is dependent on the voltage over second capacitor C1 to the supply voltage input of the pulse generator, whereby the signal is used for the voltage supply of the pulse generator, and corresponds to the voltage that is adjacent over capacitor C1, when the voltage exceeds the first threshold value.

Figure 2:
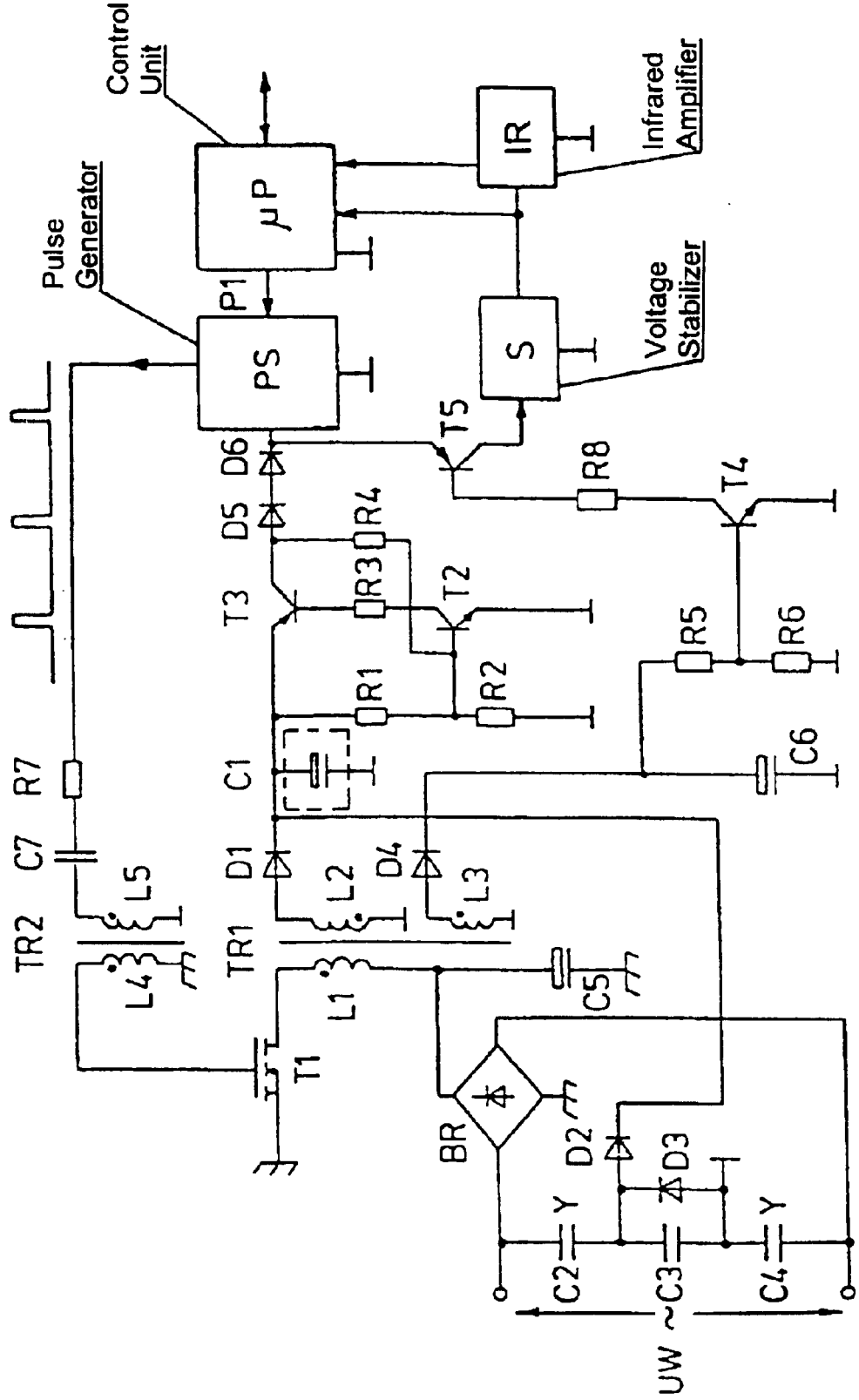
FIG. 2 is a block and schematic circuit diagram of a second exemplary embodiment of a switched-mode power supply according to the invention.

The second exemplary embodiment of an inventive switched-mode power supply, shown in FIG. 2, has the same configuration at the primary side as the switched-mode power supply shown in FIG. 1.

The alternating voltage inputs of a bridge rectifier BR, at which the alternating voltage UW is adjacent, are connected with one another through a series circuit of three capacitors C2, C3, and C4. The two capacitors C2 and C4 function as what are known as Y capacitors for interference suppression. A diode D3 is connected parallel to capacitor C3. The one common connection point of capacitor C3 and diode D3 is at ground at the secondary side. A capacitor C5 is situated parallel to the direct voltage outputs of bridge rectifier BR. The one direct voltage output of bridge rectifier BR is at ground at the primary side, while the other direct voltage output of bridge rectifier BR is connected, through primary winding L1 of a transformer TR1, with the drain electrode of a field-effect transistor T1, whose source electrode is at ground at the primary side. A series circuit of a diode D1 and a capacitor C1 is situated parallel to first secondary winding L2 of transformer TR1. The common connection point of first secondary winding L2 and capacitor C1 is at ground at the secondary side. The common connection point of the two capacitors C2 and C3 is connected with the common connection point of diode D1 and capacitor C1 through a diode D2. The common connection point of diode D1 and capacitor C1 is connected through the emitter-collector path of a transistor T3 that acts as a switch, as well as two diodes D5 and D6 connected in series thereto with the one supply voltage input of a pulse generator PS, whose other supply voltage input is at ground at the secondary side. A voltage divider made up of a resistor R1 and R2, whose center tap is connected with the base of a transistor T2 and, through a resistor R4, with the collector of transistor T3, is situated parallel to capacitor C1. The base of transistor T3 is at ground at the secondary side through a series circuit of a resistor R3 and the collector-emitter path of a transistor T2.

A series circuit of a diode D4 and a capacitor C6 is situated parallel to a second secondary winding L3 of transformer TR1. The common terminal connection of second secondary winding L3 and capacitor C6 is at ground at the secondary side. A voltage divider made up of a resistor R5 and R6, whose center tap is connected with the base of a transistor T4, is situated parallel to capacitor C6. The emitter of transistor T4 is at ground at the secondary side, while its collector is connected, through a resistor R8, with the base of a transistor T5. The one supply voltage input of pulse generator PS is connected, through the emitter-collector path of transistor T5, with the input of a voltage stabilizer S whose output is connected with the one supply voltage input of a control unit $\mu P$ and of an infrared amplifier IR. The other supply voltage inputs of control unit $\mu P$, which can be for example a microprocessor, and of infrared amplifier IR are at ground at the secondary side. The control output of control unit $\mu P$ is connected with the control input of pulse generator PS, whose pulse output is connected, through an RC element made up of a resistor R7 and a capacitor C7, with the one terminal connection of primary winding L5 of a transformer TR2, whose other terminal connection is at ground at the secondary side. The one terminal connection of secondary winding L4 of transformer TR2 is at ground at the primary side, while its other terminal connection is connected with the gate electrode of MOS field-effect transistor T1.

The voltage divider made up of resistors R1 and R2, as well as transistor T2, resistor R3, and resistor R4, form threshold value detector SD1, while threshold value detector SD2 is made up of the voltage divider having resistors R5 and R6, and transistor T4 and resistor T8.

The resistor divider made up of resistors R1 and R2 is of high-ohmic construction so that it diverts only a small part of the current supplied by Y capacitors C2 and C4 against the secondary-side ground. When the voltage at capacitor C1 reaches the predeterminable minimum value, transistor T2 becomes conductive so that-the switching transistor receives a base current and, thus, likewise goes into the conductive state. Because the voltage increasing at the collector of switching transistor T3 is fed back, through resistor R4, to the base of transistor T2, the two transistors T2 and T3 are now fully switched through. To not adversely affect the feeding back, the pulse generator is, however, at first maintained at zero current through the forward voltages of the two diodes D5 and D6. Only when the voltage at the collector of transistor T3 has passed the two diode threshold values is pulse generator PS supplied with a supply voltage and, thus, sends the first switching pulse to primary winding L5 of transformer TR2 through the RC element made up of resistor R7 and capacitor C7. Through the voltage induced in secondary winding L4 of transformer TR2, which is adjacent to the gate electrode of MOS field-effect transistor T1, the switching transistor T1 is switched on. The duration of the switch-on pulse is determined by pulse generator PS. During the switching-on pulse, the direct voltage supplied by bridge rectifier BR is adjacent to capacitor C5, for which an electrolytic capacitor is preferably provided. Due to conductive MOS transistor T1, this voltage is also adjacent to primary winding L1 of transformer TR1. The direction of winding of secondary winding L2 of transformer TR1 is selected such that a forward converter is formed. Capacitor C1 is now further charged by the current supplied from secondary winding L2 and flowing through diode D1. The charge current through diode D1 depends on the level of alternating voltage UW at bridge rectifier BR and on the degree of coupling between primary winding L1 and secondary winding L2 of transformer TR1. For current limitation, a resistor or an inductor having a freewheeling diode or protective diode can be provided. First secondary winding L2 is realized as a forward converter, and second secondary winding L3 is realized as a flyback converter because, in such a configuration, an immediate recharging of capacitor C1 is enabled, even given secondary voltages that are still low at the flyback converter made up of secondary winding L3 and diode D4. This has the advantage that the voltage at capacitor C1 lies above the minimum value necessary for the operation of pulse generator PS.

After the switching-on pulse for MOS field-effect transistor T1, transformer TR1 emits its magnetic energy, through second secondary winding L3 and diode D4, to capacitor C6, which, like capacitor C1, is preferably realized as an electrolytic capacitor. Because the direction of winding of secondary winding L3 (realized as a flyback converter) is opposite to the direction of winding of first secondary winding L2, capacitor C1 is now discharged mainly through the operating current for pulse generator PS, which flows through transistor T3 and diodes D5 and D6. If the supply voltage at pulse generator PS decreases below a predeterminable threshold value, then pulse generator PS emits the next switching-on pulse to MOS transistor T1. Through such a measure, the voltage at capacitor C1 is always maintained above the predetermined minimum value. The intrinsic current consumption of pulse generator PS and the width of the switching-on pulses thereby determine the frequency. The pulse-duty ratio between the switching-on pulse and the period duration is selected large enough that transformer TR1 has sufficient time for demagnetization until the next switching-on pulse. Due to the flyback converter function of second secondary winding L3 of transformer TR1, capacitor C6 continues to be charged until the voltage at capacitor C6 reaches the predeterminable minimum value, at which transistor T4 goes over into the conductive state. As the voltage increases at capacitor C6, the demagnetization time of transformer TR1 becomes shorter. Through resistor R8, through-connected transistor T4 draws the base of transistor T5 to ground at the secondary side so that transistor T5 becomes conductive and the voltage prevailing at the common connection point of diode D6 and at the one supply voltage input of pulse generator PS is applied to the input of voltage stabilizer S. Both control unit μP and infrared amplifier IR, thus, receive a stabilized supply voltage. The fact that control unit μP is switched on only after the switching on of pulse generator PS has the advantage that the current consumption during the first part of the starting up is low and that the switching frequency is low enough to provide sufficient time for the demagnetization of transformer TR1.

If control unit μP requires only a low current, resistors R5, R6, and R8, as well as transistors T4 and T5, are not required. If, for example, a microprocessor in CMOS technology without cross current or the quadrature-axis component of current is provided for control unit μP, then it is also sufficient to enable the oscillator with a delay, if it does not start up with a delay from the outset.

Control unit μP is switched on, starts up, and takes over the controlling of pulse generator PS. Control unit μP also takes over, after starting up, the controlling of the switched-mode power supply for all provided operating modes if it receives the corresponding switch-on commands from infrared amplifier IR. Otherwise, the switched-mode power supply can remain, for example, in the standby state.

Because first secondary winding L2 of transformer TR1 and diode D1 form a forward converter, the standby operation can be fashioned such that the voltage at capacitor C1 of control unit μP is regulated independent of the alternating voltage UW at the input of the switched-mode power supply, while the voltage at the flyback converter made up of second secondary winding L3 and diode D4 decreases strongly. Through such a measure, the efficiency in standby operation can be advantageously increased.

Figure 3:
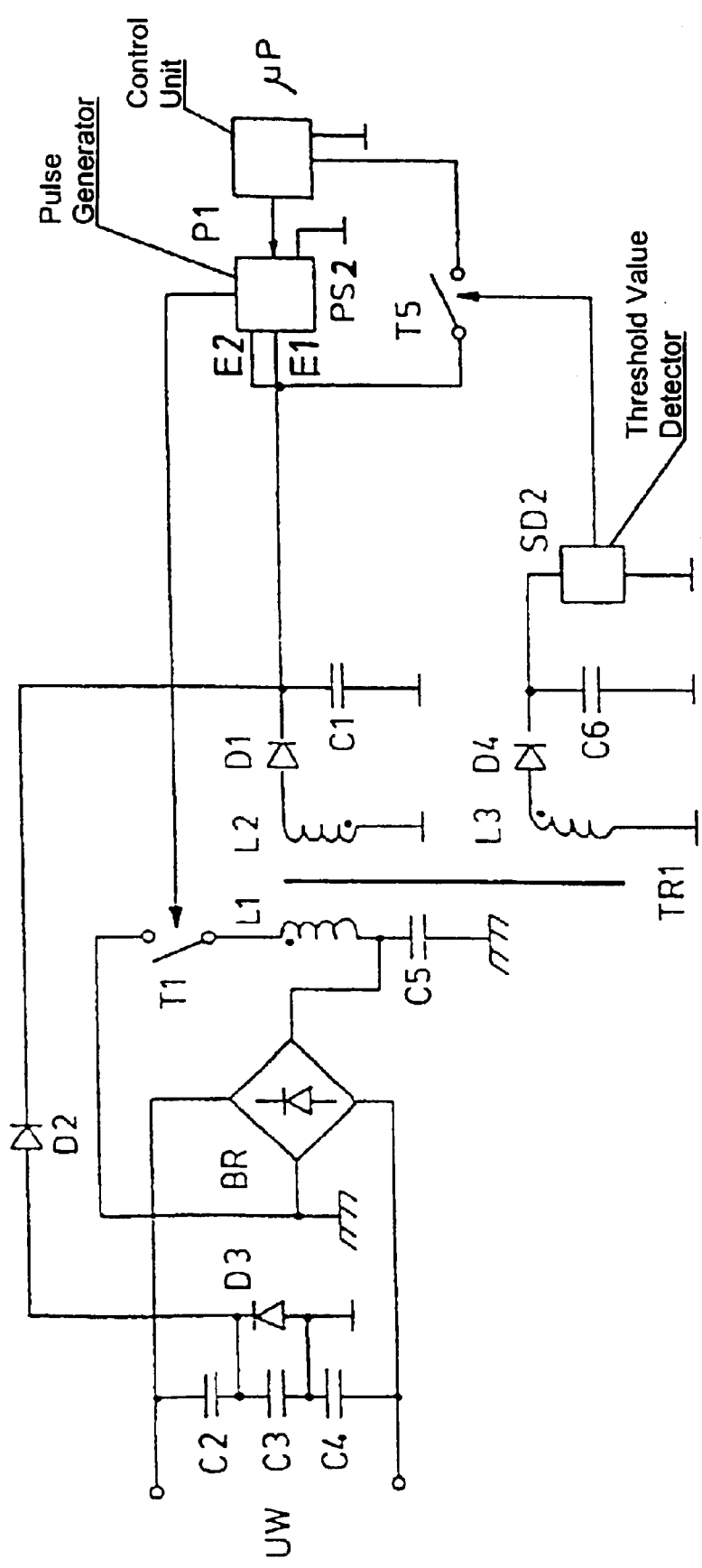
FIG. 3 is a block and schematic circuit diagram of a third exemplary embodiment of a switched-mode power supply according to the invention.

FIG. 3 shows a further exemplary embodiment of an inventive switched-mode power supply that differs from the switched-mode power supplies shown in FIGS. 1 and 2 in the selection of the pulse generator and in the supply of the voltage through capacitor C1 to pulse generator PS. In the exemplary embodiments previously specified, pulse generator PS is connected to second capacitor C1 in a manner dependent on the voltage over second capacitor C1 to ensure a supply of voltage and current. The pulse generator can, thereby, receive current only if switch T3 is closed.

In contrast, pulse generator PS2 according to FIG. 3 has a first input E1 and a second input E2, whereby the first input E1 acts as a voltage supply input, and the second input E2 acts as a voltage detection input. In such an embodiment, the common node of diode D1 and capacitor C1 is connected directly to the two inputs E1, E2. Dependent on the voltage adjacent to voltage detection input E2, pulse generator PS2 assumes a first or a second state, whereby, in the first state, pulse generator PS2 produces no drive pulses for controllable switch T1 and receives a current through voltage supply input E1 that is low in relation to the second state. The first state corresponds to a standby state of the pulse generator. In the second state, pulse generator PS2 produces drive pulses for controllable switch T1 and, for such a purpose, receives, through the voltage supply input, a current that is higher in relation to the first state. The second state corresponds to an operating state of pulse generator PS2. The pulse generator is constructed such that it goes from the first state into the second state when the voltage at the voltage detection input exceeds a first threshold value and that the pulse generator goes from the second state into the first state when the voltage at the voltage detection input falls below a second threshold value, whereby the second threshold value is preferably smaller than the first threshold value.

The voltage supplied to voltage detection input E2 in this exemplary embodiment acts as a signal, dependent on which pulse generator PS2 produces drive pulses for switch T1.

A first advantage of the invention is that the Y capacitors that are already present in a switched-mode power supply are used for an additional purpose. A second advantage is that all additional discrete components can be operated with low voltage so that the circuit is well suited for integration.

We claim:

1. A method for starting up a switched-mode power supply, which comprises:
   providing a bridge rectifier having alternating voltage inputs and direct voltage outputs;
   disposing an alternating voltage at the alternating voltage inputs of the bridge rectifier;
   connecting the alternating voltage inputs with one another through a Y capacitor circuit including one of:
   a Y capacitor; and
   a series circuit of two Y capacitors;
   providing a first transformer having a primary winding and a secondary winding;
   providing a first series circuit made up of the primary winding of the first transformer and a first controllable switch having a control input;
   connecting the control input of the first controllable switch with an output of a pulse generator;
   connecting a parallel circuit made up of the first series circuit and a first capacitor to the direct voltage outputs of the bridge rectifier;

connecting a second series circuit made of a first diode and a second capacitor in parallel to the secondary winding of the first transformer;

transmitting energy collected by the Y capacitor circuit to the second capacitor; and driving the controllable switch by producing pulses with the pulse generator dependent on a voltage tapped at the second capacitor.

2. The method according to claim 1, which further comprises recharging the secondary capacitor by bypassing the bridge rectifier and the transformer.

3. The method according to claim 1, which further comprises producing drive pulses with the pulse generator when the voltage tapped at the second capacitor exceeds a first threshold value.

4. The method according to claim 1, which further comprises producing no drive pulses with the pulse generator when the voltage tapped at the second capacitor falls below a second threshold value.

5. The method according to claim 3, which further comprises producing no drive pulses with the pulse generator when the voltage tapped at the second capacitor falls below a second threshold value.

6. A method for starting up a switched-mode power supply, which comprises:

providing a bridge rectifier having alternating voltage inputs and direct voltage outputs;

disposing an alternating voltage at the alternating voltage inputs of the bridge rectifier;

connecting the alternating voltage inputs with one another through a Y capacitor circuit including one of:
a Y capacitor; and
a series circuit of two Y capacitors;

providing a first transformer having a primary winding and a secondary winding;

providing a first series circuit made up of the primary winding of the first transformer and a first controllable switch having a control input;

connecting the control input of the first controllable switch with an output of a pulse generator, the pulse generator having a supply voltage input;

connecting a parallel circuit made up of the first series circuit and a first capacitor to the direct voltage outputs of the bridge rectifier;

connecting a second series circuit made of a first diode and a second capacitor in parallel to the secondary winding of the first transformer;

transmitting energy collected by the Y capacitor circuit to the second capacitor;

driving the controllable switch by producing pulses with the pulse generator dependent on a voltage tapped at the second capacitor; and applying the voltage tapped at the second capacitor to the supply voltage input of the pulse generator only when the voltage tapped at the second capacitor reaches a first predeterminable minimum value.

7. A method for starting up a switched-mode power supply, which comprises:

providing a bridge rectifier having alternating voltage inputs and direct voltage outputs;

disposing an alternating voltage at the alternating voltage inputs of the bridge rectifier;

connecting the alternating voltage inputs with one another through a Y capacitor circuit including one of:
a Y capacitor; and
a series circuit of two Y capacitors;

providing a first transformer having a primary winding and a secondary winding;

providing a first series circuit made up of the primary winding of the first transformer and a first controllable switch having a control input;

connecting the control input of the first controllable switch with an output of a pulse generator;

connecting a parallel circuit made up of the first series circuit and a first capacitor to the direct voltage outputs of the bridge rectifier;

connecting a second series circuit made of a first diode and a second capacitor in parallel to the secondary winding of the first transformer;

transmitting energy collected by the Y capacitor circuit to the second capacitor;

driving the controllable switch by producing pulses with the pulse generator dependent on a voltage tapped at the second capacitor;

connecting a control unit to the pulse generator for controlling the pulse generator; and applying the voltage tapped at the second capacitor to the control unit only after a predeterminable time period after a switching on of the pulse generator.

8. The method according to claim 7, which further comprises:

providing a third series circuit made up of a second diode and a third capacitor;

connecting a second secondary winding of the first transformer in parallel to the third series circuit;

producing a voltage with the second secondary winding of the first transformer at the third capacitor; and applying the voltage tapped at the second capacitor to the control unit when the voltage at the third capacitor reaches a second predeterminable minimum value.

9. A switched-mode power supply having a starting circuit, the power supply comprising:

a bridge rectifier having alternating voltage inputs to be connected to an alternating voltage, at least one direct voltage output, and a control input;

a plurality of Y capacitors including two y capacitors connected in series to form a first series circuit having a first common connection point;

said alternating voltage inputs of said bridge rectifier connected with one another through one of the group consisting of:
one of said Y capacitors; and
said first series circuit;

a pulse generator having an input and an output;

a transformer having a primary winding and a secondary winding;

a controllable switch connected in series to said primary winding to form a second series circuit;

a first capacitor connected in parallel to said second series circuit to form a parallel circuit, said parallel circuit connected to said at least one direct voltage output of said bridge rectifier;

a first diode and a second capacitor connected in series to form a third series circuit having a second common connection point, said third series circuit connected in parallel to said secondary winding of said transformer;

a second diode connecting said first common connection point to said second common connection point; and a signal supply device supplying a signal dependent on a voltage over said second capacitor to said input of said pulse generator.

10. The switched-mode power supply according to claim 9, wherein:

said input of said pulse generator is a supply voltage input;

a system is connected to said second capacitor and has:
a first threshold value detector having an output, said first threshold value detector connected in parallel with said second capacitor and tapping said voltage at said second capacitor; and
a second controllable switch having a control input connecting said supply voltage input of said pulse generator with said second common connection point, said second controllable switch connected to said second capacitor; and said output of said first threshold value detector is connected to said control input of said second controllable switch.

11. The switched-mode power supply according to claim 9, wherein:

said input of said pulse generator has a supply voltage input and a control input;

said transformer has a second secondary winding;

a third diode and a third capacitor are connected in series to form a fourth series circuit;

said second secondary winding is connected in parallel with said fourth series circuit;

a second threshold value detector has an output;

a control unit has:
a supply voltage input; and
a control output connected to said control input of said pulse generator;

a second controllable switch has a control input, said second controllable switch connecting said supply voltage input of said pulse generator to said supply voltage input of said control unit;

said second threshold value detector is connected in parallel to said third capacitor; and said output of said second threshold value detector is connected to said control input of said second controllable switch.

12. The switched-mode power supply according to claim 9, including:

a fourth diode; and a fourth capacitor connected in parallel to said fourth diode to form a second parallel circuit, said second parallel circuit disposed between said two Y capacitors.

13. The switched-mode power supply according to claim 10, including at least one fifth diode disposed between said second controllable switch and said supply voltage input of said pulse generator.

14. The switched-mode power supply according to claim 9, including:

a second transformer having a primary winding and a secondary winding;

an RC element having a fifth capacitor and a first resistor;

said output of said pulse generator being a control output connected through said RC element to said primary winding of said second transformer; and said secondary winding of said second transformer being connected with said controllable switch.

15. The switched-mode power supply according to claim 14, wherein:

said bridge rectifier has a direct voltage terminal connection;

said controllable switch has a terminal connection;

said secondary winding of said second transformer has a terminal connection;

a fourth diode and a fourth capacitor are connected in parallel to form a second parallel circuit having a third common connection point, said second parallel circuit is disposed between said two Y capacitors;

said primary winding of said second transformer has a terminal connection;

said transformer has a second secondary winding;

said secondary winding and said second secondary winding of said transformer each have a terminal connection;

said direct voltage terminal connection of said bridge rectifier, said terminal connection of said controllable switch, and said terminal connection of said secondary winding of said second transformer are at ground at a primary side; and said third common connection point, said terminal connection of said primary winding of said second transformer, and said terminal connection of each of said secondary winding and said second secondary winding of said transformer are at ground at a secondary side.

16. The switched-mode power supply according to claim 9, wherein said secondary winding of said transformer has a winding direction to form a forward converter.

17. The switched-mode power supply according to claim 11, wherein:

said secondary winding of said transformer has a given winding direction; and said second secondary winding of said transformer has a winding direction opposite to said given winding direction to form a flyback converter.

18. The switched-mode power supply according to claim 11, wherein:

a fourth capacitor and a fourth diode are connected in parallel to form a third parallel circuit with first and second terminal connections;

said third parallel circuit is disposed between said two Y capacitors, said first terminal connection of said third parallel circuit being at ground at a secondary side and said second terminal connection of said third parallel circuit being connected, through said second diode, with said second common connection point;

second and third resistors connected together to form a first voltage divider, said first voltage divider divided connected in parallel with said second capacitor and having a center tap;

a common connection point of said secondary winding of said transformer and said second capacitor is at secondary-side ground;

a common connection point of said second secondary winding of said transformer and said third capacitor is at secondary-side ground;

said input of said pulse generator has a first supply voltage input and a second supply voltage input, said second supply voltage input is at ground at a secondary side;

a second transistor has an emitter, a collector, and a base;
a fifth series circuit includes an emitter-collector circuit of said second transistor, a fifth diode, and a sixth diode;
said second common connection point is connected with said first supply voltage input of said pulse generator through said fifth series circuit;
a third transistor has a collector-emitter path, and a base;
a fourth resistor is connected to said collector-emitter path of said third transistor to form a sixth series circuit;
said base of said second transistor is at secondary-side ground through said sixth series circuit;
said base of said third transistor is connected to:
said center tap of said first voltage divider; and
to said collector of said second transistor through a fifth resistors;
a fourth transistor has an emitter and an emitter-base path;
a fifth transistor has a base and a collector-emitter path;
said emitter-base path of said fourth transistor, a sixth resistor, and said collector-emitter path of said fifth transistor are connected to form a seventh series circuit;
said first supply voltage input of said pulse generator, to which said sixth diode is connected, is at secondary-side ground through said seventh series circuit;
seventh and eighth resistors are connected to form a second voltage divider having a center tap;
said second voltage divider is connected in parallel with said third capacitor;
said center tap of said second voltage divided is connected with said base of said fifth transistor;
said supply voltage input of said control unit has first and second supply voltage inputs, said second supply voltage input is at ground at a secondary side;
said emitter of said fourth transistor is connected to said first supply voltage input of said control unit;
a second transformer has a primary winding and a secondary winding with a first terminal and a second terminal;
an RC element has a fifth capacitor and a first resistor;
said RC element is connected to said primary winding of said second transformer to form an eighth series circuit;
said output of said pulse generator is connected to ground at a secondary side through said eighth series circuit;
said first terminal of said secondary winding of said second transformer is at ground at a primary side;
said controllable switch is a transistor with a gate electrode; and
said second terminal of said secondary winding of said second transformer is connected with said gate electrode of said controllable switch.

19. The switched-mode power supply according to claim 18, wherein:
said fourth transistor has a collector;
an infrared amplifier has first and second supply voltage inputs and an output;
said collector of said fourth transistor is connected with said first supply voltage input of said infrared amplifier;
said second supply voltage input of said infrared amplifier is at ground at a secondary side; and
said output of said infrared amplifier is connected with said supply voltage input of said control unit.

20. The switched-mode power supply according to claim 19, including a voltage stabilizer disposed between:
said collector of said fourth transistor; and
said control unit and said infrared amplifier.

21. The switched-mode power supply according to claim 11, wherein said control unit is a microprocessor.

22. The switched-mode power supply according to claim 18, wherein the starting circuit including said second through sixth diodes, said second through eighth resistors, and said third, fourth, and fifth transistors is an integrated circuit.

23. The switched-mode power supply according to claim 18, wherein said second through sixth diodes, said second through eighth resistors, and said third, fourths and fifth transistors form at least part of the starting circuit and comprise an integrated circuit.

24. The switched-mode power supply according to claim 9, wherein:
said input of said pulse generator is a supply voltage input; and
said first input is connected to said second common connection point.

25. The switched-mode power supply according to claim 23, wherein:
said pulse generator has a second voltage detection input; and
said second voltage detection input is connected to said second common connection point.

26. The switched-mode power supply according to claim 25, wherein, dependent upon a signal at said second voltage detection input, said pulse generator is adapted to assume one of:
a first state in which no drive pulses are available at said output of said pulse generator; and
a second state in which drive pulses are available at said output of said pulse generator.

27. The switched-mode power supply according to claim 9, wherein said at least one direct voltage output is a plurality of direct voltage outputs.

* * * * *